March 15, 1955  J. ORLANSKY  2,704,321
AIRCRAFT ILLUMINATING SYSTEM FOR IDENTIFICATION
Filed March 4, 1949
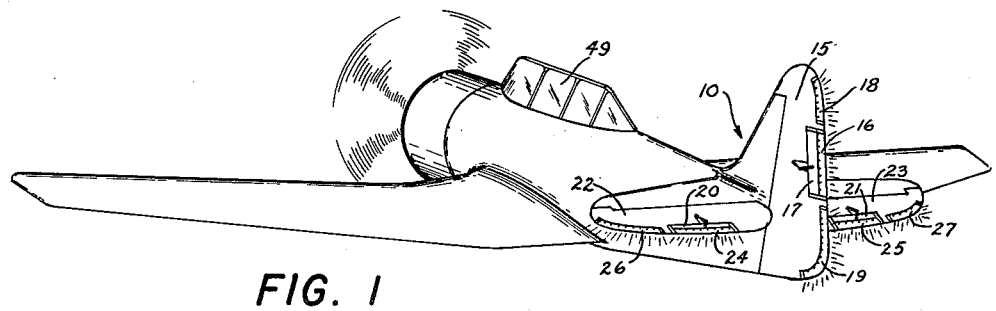
FIG. 1
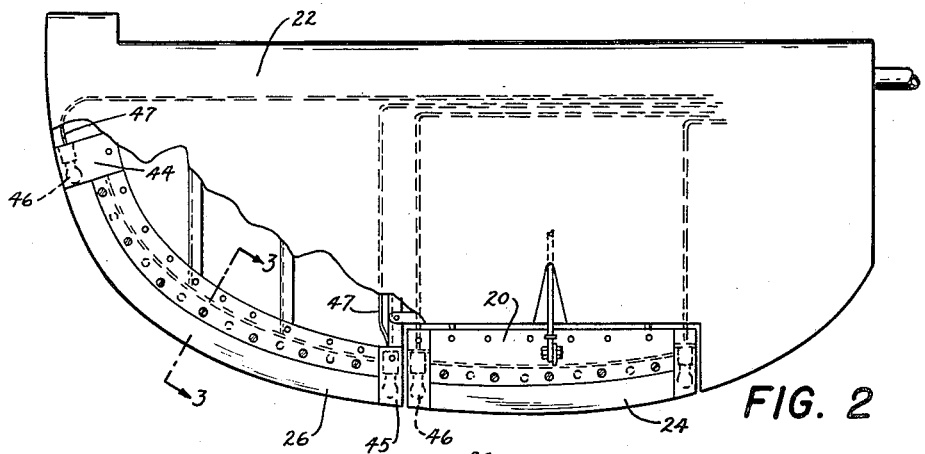
FIG. 2
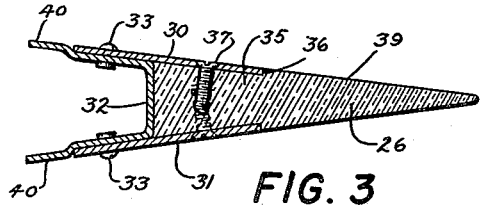
FIG. 3
FIG. 4
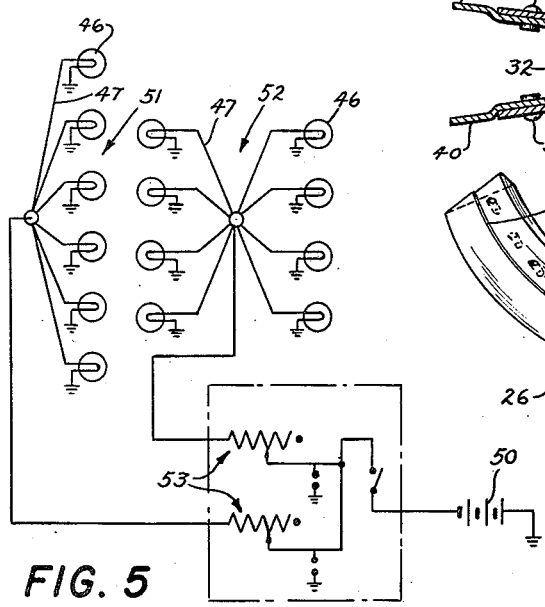
FIG. 5
INVENTOR.
JESSE ORLANSKY
BY
ATTORNEY

United States Patent Office 2,704,321
Patented Mar. 15, 1955

2,704,321

AIRCRAFT ILLUMINATING SYSTEM FOR IDENTIFICATION

Jesse Orlansky, New York, N. Y.

Application March 4, 1949, Serial No. 79,662

1 Claim. (Cl. 240—7.7)

(Granted under Title 35, U. S. Code (1952), sec. 266)

The present invention pertains to the art of lighting aircraft, and particularly to lighting aircraft for conditions of night flying in formation. The invention is accordingly embodied in a novel lighting system for aircraft.

The lighting system of the present invention comprises strips or lines of light embodied in certain edges of certain of the components of an aircraft. Under preferred practice of the present invention, the strips of light are positioned in the empennage, and specifically along the trailing edges of certain components thereof. Strips of light embodied in the trailing edges of the rudder and its trim-tab and of the fins and their trim-tabs cross each other, and are seen as an illuminated cross that serves as a means for identifying the craft. The illuminated cross enables an observer, for example in other aircraft of a formation, to determine readily the precise attitude and orientation of the craft. This enables planes to fly in closer formation, and inhibits the danger of accidental collisions.

It is desired that the strips of light only glow, and that they are not so bright as to interfere with the dark adaptation of the pilots. Certain well-known translucent materials, "lucite" for example, have a critical angle of light refraction of a magnitude for nearly all light rays passing through the material to be totally internally reflected, and it has been found suitable to employ this property of the mentioned materials to carry out the objects of the present invention.

Strips of suitable material having the above-identified properties are formed to the contour of, and they are installed to constitute, the trailing edge of any component selected for the purpose of carrying out the principles of the invention. A source of light is positioned at one end of the strip or at both ends, the light source preferably being housed and enclosed within the component. A quantity of the light from the source penetrates the surface of the material, and this light is distributed homogeneously throughout the area of exposed surface of the strip. This produces an elongated glow of light that is not glaring, but is clearly visible at night to demark the incident edge of the component.

Under preferred practice, mechanism is provided to control adjustably the candlepower of the light source, to vary the intensity of the lines of light according to different conditions of visibility. In the case of electric lighting being used in the system, the adjustable control mechanism can be a simple variable resistance or rheostat.

For a fuller understanding of the principles of the invention and a detailed disclosure of one practical embodiment thereof, attention is now directed to the accompanying drawings, in which Fig. 1 is a perspective of an airplane in flight which embodies the present invention, Fig. 2 is a detail plan, with parts shown broken away, of one of the fins of the airplane in Fig. 1, Fig. 3 is a cross-sectional elevation, taken on line 3—3 of Fig. 2, Fig. 4 is a perspective of a strip of the material used for the trailing edge of the fin in Fig. 2, and Fig. 5 is a wiring diagram suitable for the lighting system of the present invention.

The airplane of Fig. 1 illustrates the present invention embodied in the empennage 10 thereof, the invention comprising the trailing edges of the empennage components constructed to be luminous. The rudder 15 comprises the luminous strip 16 extending along the trailing edge of the rudder trim-tab 17, the strip 16 being extended in both directions to comprise the strips 18 and 19, respectively above and below the trim-tab and embodying the trailing edge of the rudder 15. In a similar manner, the trim-tabs 20 and 21 of the left and right fins, 22 and 23 respectively, comprise the respective luminous strips 24 and 25 which are respectively extended to include the luminous strips 26 and 27 embodied in the respective trailing edges of left and right fins 22 and 23.

In the preferred construction shown, each of the luminous strips 16, 18, 19, 24, 25, 26 and 27 consists of a length of translucent material, the surface of which is formed or otherwise contoured to correspond with the contour of the trailing edge of its incident component, and the strip is built into the component to constitute the trailing edge thereof. The translucent material is preferably one having a critical angle of light refraction of a magnitude for nearly all light rays passing through the material to be totally internally reflected. One such material that is suitable for the purpose is sold, and is well known, under the trade name, "lucite."

Any suitable method or means may be provided for building the strip of translucent material into its component. One construction found suitable is illustrated, for example, in Figs. 2, 3 and 4, with reference to the strip 26 of the fin 22. The construction of other components is similar.

Two strips 30 and 31 of sheet metal are attached to each other by means of the intermediate channel piece or member 32 to which they are secured by rivets 33 or other suitable means. The assembly comprising the channel member 32 and strips 30 and 31 provides a mount that is grooved lengthwise to receive the strip 26. The strip 26 comprises the base 35 that is contoured to fit in the groove of the assembly 30, 31, 32, and is mortised at 36 for the strips 30 and 31 to seat smoothly in engagement with the material of the strip 26. Screws 37 secure the strip 26 to the assembly 30, 31, 32, and the base 35 is drilled and tapped at 38 to receive the rows of screws 37 on opposite sides thereof.

The exposed surface 39 of strip 26 constitutes the lighting portion thereof and is contoured to conform with the contour of the trailing edge of its component 22. The exposed surface 39 is smoothly continuous with the exposed surface of strips 30 and 31 which also are contoured to conform with the surface contour of the component. Channel piece 32 is formed for its outside surface 40 along its edges to lie smoothly continuous with the exposed surfaces of strips 30 and 31. The edges of channel piece 32 at 40 provide flanges suitable for attaching the assembly 30, 31, 32 to the component 22 in position to constitute the trailing edge thereof.

Housings 44 and 45 for electrical lights 46 are provided at the opposite ends of the strip 26, the housings being contoured to conform with the surface contour of the fin 22. Similar housings are provided at each of opposite ends of the other translucent strip 16, 17, 18, 24, 25 and 27, in each case the housing being contoured to conform with the contour of its incident component.

Each housing contains an electric light 46, which is connected by suitable electrical leads 47 to a source of electricity. The housings 44 and 45 are constructed of opaque material, and they operate to confine light from the electric lights 46. Light beams from the sources 46 enter the strips such as 26 through the end surfaces 48 thereof, and pass through the strips lengthwise thereof. This light is transmitted through the strips in such a manner that it appears distributed along the exposed surfaces 39 of the strips, the distribution being uniform and the appearance being a continuous uniform glow throughout the length of any given strip 26.

The surfaces 39 of strips 16, 18, 19, 24, 25, 26 and 27 may present the naturally polished finish of the material from which they are made, or the surfaces 39 may be frosted if a more uniform diffusion of illumination is desired. Frosting may be accomplished by gentle abrasion of the incident surface, by the application of a thin white paint, or in any other suitable manner. If desired for the purpose of more uniform light diffusion, frosting of the surfaces of strips 16, 18, 19, 24, 25, 26 and 27 may be extended to include areas embodied in the base 35, i. e., the surfaces that engage the inside surfaces of the assembly of strips 30 and 31 and channel member 32. It is preferred under any circumstance, however, that the end surface 48 of the strips, through which the illumination is obtained from the electric lights 46, be left in polished condition.

To an observer, either on the ground or in another plane in the formation, the appearance of the illuminating system of the present invention is a line of light in an upright direction disposed along the trailing edge of rudder 15, and a transverse line of light disposed along the trailing edges of the fins 22 and 23 which extends away from the rudder to the right and left. See Fig. 1. To an observer at close range it is obvious that the crossed lines are broken and made up of sections demarked by the trim tabs of the vertical and horizontal components constituting the rudder 15 and fins 22 and 23 respectively. But when viewed from any appreciable distance the lines of light present the appearance of a luminous cross that constitutes a distinctive marking of the craft, and which is readily visible at night or during other times of poor visibility.

It will be noted that the lighting system of the present invention is positioned aft of the pilot, who occupies a seat under the cowl 49, Fig. 1. The lines of light at the trailing edges of components of the empennage are not directed light, and constitute lines of glow. They therefore do not interfere with the dark adaptation of the pilots of either the observed craft or other craft in the formation.

Any suitable source of electricity can be provided for the electric lights 46. Fig. 5 illustrates a wiring diagram that has been employed in practice and found suitable. The battery 50, or other suitable electrical supply, feeds electricity through leads 47 to the lights 46 of the rudder 15 and its tab 17, illustrated in the group of lights 51, and also feeds electricity to the group of lights 52 for the left and right fins 22 and 23 and their respective tabs 24 and 25. Suitable variable resistances 53 are provided for the groups 51 and 52 of lights 44, these being provided to control the magnitude of glow and adjust it to meet the varying requirements of variations in weather conditions and visibility.

The disclosed construction is one practical embodiment of the invention, the scope of which is not determined by the disclosure. The scope of the invention is determined by the accompanying claim.

The invention described herein may be manufactured and used by or for the Government of the United States of America for governmental purposes without the payment of any royalties thereon or therefor.

I claim:

In an aircraft component having a trailing edge, the structure of the trailing edge comprising a strip constituting a single and continuous piece of translucent material, a portion of the surface of the strip being formed to the contour of and positioned to constitute surface of a predetermined lengthwise portion of the trailing edge of the component, the material of the strip having a critical angle of light refraction of a magnitude for nearly all light rays passing through the material to be totally internally reflected, a source of light positioned at one end at least of the strip and enclosed in the component.

References Cited in the file of this patent

UNITED STATES PATENTS

| | | |
|---|---|---|
| 1,790,251 | Sipp | Jan. 27, 1931 |
| 2,207,117 | Collins | July 9, 1940 |
| 2,328,032 | Roper | Aug. 31, 1943 |
| 2,337,744 | Garstang | Dec. 28, 1943 |
| 2,337,746 | Garstang | Dec. 28, 1943 |
| 2,375,075 | Carruth | May 1, 1945 |
| 2,423,528 | Stewart | July 8, 1947 |
| 2,532,104 | King | Nov. 28, 1950 |